INVENTORS
WALTER BRUCKERT
DAVID I-J. WANG
BY John C. LeDuc
ATTORNEY

INVENTORS
WALTER BRUCKERT
DAVID I-J. WANG
ATTORNEY

United States Patent Office 3,282,576
Patented Nov. 1, 1966

3,282,576
APPARATUS FOR IMPROVED LIQUID-VAPOR CONTACT
Walter Bruckert, Feldstrasse, Germany, and David I-J. Wang, Buffalo, N.Y., assignors to Union Carbide Corporation, a corporation of New York
Continuation of application Ser. No. 436,430, Mar. 2, 1965. This application Jan. 28, 1966, Ser. No. 532,040
6 Claims. (Cl. 261—114)

This is a continuation of application Serial No. 436,430, filed March 2, 1965, now abandoned, which in turn is a continuation-in-part of application Serial No. 136,796, filed September 8, 1961, and now abandoned.

The present invention relates to an improved liquid-vapor contact tray and in particular to means for promoting complete tray activity over the entire tray surface.

Typically, in mass transfer operations employing plates and trays, as for example in distillation, a descending liquid is brought into intimate contact with a rising vapor by repetitive intermixing and disengagement of the two phases. The degree of mass transfer of a given component between these phases is determined largely by the intimacy of this contact. Maximum utilization of each tray requires close approach to phase equilibrium at all points on the tray, but this condition has rarely been obtained by the prior art.

A major factor which has prevented reasonable approaches to phase equilibrium has been the existence of partial inactivity of the contacting surface whereby the process vapor fails to pass through the prior art tray and the liquid thereupon at all points. Thus a substantial portion of the contacting surface merely transports clear liquid and contributes nothing to the mass-transfer process. Furthermore, such inactive areas are prone to weep or drain liquid to the tray below thereby altering liquid-vapor ratios on one tray and upsetting fluid compositions on the next.

Partial inactivity occurs on a given tray when the tray and its liquid present non-uniform resistance to vapor flow entering the tray. A common cause is the hydrostatic gradient which normally comprises the driving force for moving the liquid across the tray. Inactivity can be reduced significantly by eliminating this gradient, for example, by employment of vapor thrust, rather than gravity, to propel the liquid. Vapor thrust for this purpose may be generated by inclined openings properly arranged to move the liquid at desired velocity and in a desired direction.

Despite the elimination of gradient and other improvements we have noted that a certain area, notably the liquid inlet area, exhibits chronic inactivity and have discovered means to impart full activity to such area. Furthermore, this activation is accomplished without resort to the usual, expensive remedy of increasing the vapor phase pressure drop by reducing the free area of the tray.

As used herein the term "clear liquid" refers to a single phase, liquid fluid without physical admixture with process vapor. The term is not restricted to liquids having optical clarity, but include liquids rendered cloudy or opaque by dispersion of substances therein other than process vapor as well as those liquids which are naturally cloudy or opaque.

The terms "bubbling liquid," "foam," "froth" and "active liquid" refer to a liquid through which a gas or vapor is being passed.

The term "tray proper" refers to that portion of a tray surface which is perforated or apertured for vapor flow, exclusive of that portion illustrated and discussed hereinafter as the bubble promoter area.

It is the prime objective of this invention to provide means to reduce the pressure drop across partially active liquid-vapor contact trays while inducing substantially complete tray activity.

It is another object of this invention to provide means for eliminating the inactive liquid-inlet area on liquid-vapor contact trays, notably perforated or sieve trays, when thee liquid is induced to flow across the tray by a liquid gradient.

It is a further objective of this invention to provide means for eliminating the inactive liquid-inlet are on liquid-vapor contact trays, notably perforated or sieve trays when the liquid is induced to flow across the tray by vapor thrust.

It is a still further objective of this invention to provide process whereby partially active liquid-vapor contact trays are made completely active.

It is a still further objective of this invention to provide means, which, when used in conjunction with liquid-vapor contacting trays will render partially active trays completely active.

These and other objects and advantages of the instant invention will be apparent from the description and appended claims.

According to the present invention the liquid inlet of a given tray is constructed in such a manner as to appreciably reduce the hydrostatic head in this area preferably to a value actually less than that existing downstream of the liquid inlet. This reduced or artificial hydrostatic head presents to the rising process vapor a lower flow resistance at the tray inlet and improves the activity level thereat.

It has been found that bubbling on liquid-vapor contact trays is much more difficult to initiate than to maintain. This is because at two neighboring points on a tray the liquid, whether aerated or clear, tends to maintain the same potential energy. However, at equal potential energy an aerated body of liquid exerts a smaller hydrostatic head than a clear body of liquid. Therefore, once aeration or bubbling is initiated it tends to persist since the resistance to flow of the vapor phase is thereafter lower. Because of this difficulty in initiating bubbling it is preferable that the hydrostatic head at the inlet be less than that on the tray proper.

Once the tray inlet area has been rendered active by the bubbling promoter of this invention, i.e., once process vapor is caused to flow through the liquid immediately entering the tray, the fluids flowing across the tray will induce conditions favorable to bubbling throughout the tray proper. With an active inlet insured, it is found that the tray proper can be maintained fully active with far less mechanical pressure drop through the tray than heretobefore possible.

The ability of the bubble promoters of this invention to render the inlet area of the tray active, which in turn induces activity throughout the tray, is of major significance. Various design and operating parameters are markedly and beneficially changed by this invention. The new parameter changes allow substantial savings in the power required to move the process vapor through the mass transfer apparatus, e.g., a distillation column.

By this invention complete tray activity is insured by reducing the total resistance to vapor passage at the liquid inlet of an operating tray. The liquid inlet is constructed so as to artificially reduce the hydrostatic head of liquid at the tray inlet preferably to a value lower than the hydrostatic head existing on the tray proper. This permits utilization of a phenomenon that will be referred to as "dynamic enhancement." This phenomenon is a condition of induced activity extending over the entire surface of the tray proper downstream from a perpetually active inlet. It results from the flow or spread of low density froth from an active region across areas downstream thereof. Dynamic enhancement requires that the active liquid washing effect must be available to all areas on the tray proper at all times; the onset of inactivity must never occur at the tray inlet otherwise the effect will be lost. The bubble promoters of this invention are needed to insure activity at the inlet. Prior art trays would not benefit from dynamic enhancement because the inlet area has been the most prone to become inactive.

Figure 1:
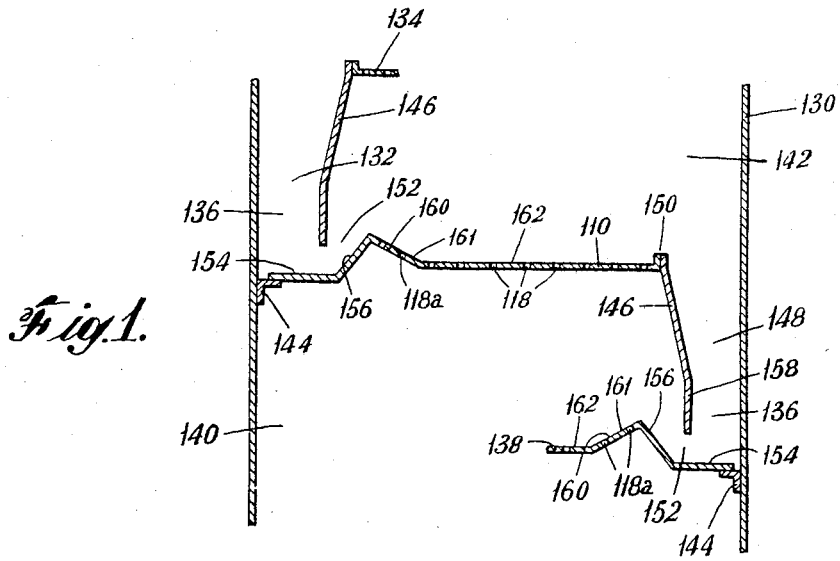
FIG. 1 is a view in cross-sectional elevation of a tray illustrating the sloped-inlet embodiment of this invention as the bubble promoter embodied in a sleeve type tray.
Figure 2:
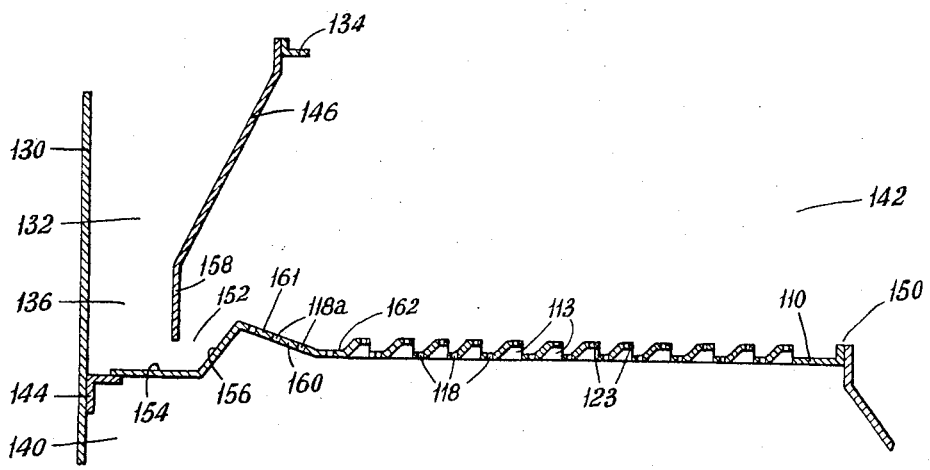
FIG. 2 is a cross-sectional elevation view of a tray illustrating the sloped inlet embodiment of this invention as the bubble promoter embodied in a slotted sieve type tray.
Figure 3:
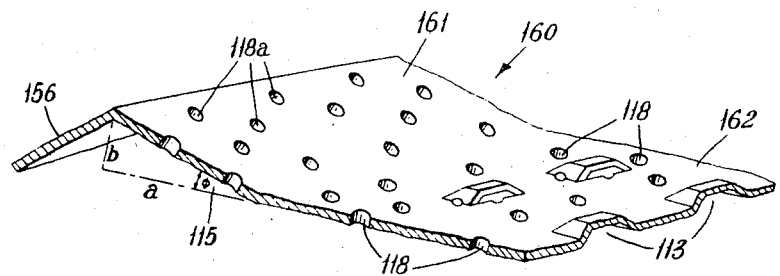
FIG. 3 is an isometric view of a portion of a slotted sieve tray illustrating the sloped inlet embodiment of this invention as the bubble promoter.

In large distillation columns where the number of trays becomes quite large a substantial power savings is eralized when the bubble promoters of this invention causing dynamic enhancement and permitting dry plate pressure drop reduction are employed. The results presented in Table A illustrate this point. The values of column pressure savings as presented in Table A, are based upon liquid air separation operations in the upper-column of a standard double-column air fractionater having 45 trays in the upper column. The inclined bubble promoter, as illustrated in FIGS. 1, 2 and 3 is used as the means for achieving full tray activity in those cases where a promoter is used.

TABLE A.—COMPARISON OF SIEVE TRAYS WITH AND WITHOUT BUBBLING PROMOTERS

| Type of Tray | Liquid Flow | Pressure Drop per 45 Trays, p.s.i. | Percent Power Savings Over Standard Sieve Tray |
|---|---|---|---|
| 1. Standard Sieve tray | By hydraulic gradient | 3.82 | 0 |
| 2. Standard sieve tray with promoter. | do | 3.65 | 4.45 |
| 3. Sieve tray, vapor thrust apertures, no promoter. | By vapor propulsion, no gradient. | 2.82 | 26.2 |
| 4. Sieve tray, vapor thrust apertures, with promoter. | do | 2.52 | 34 |

As can be seen from Table A, the use of bubble promoters with each type of tray, cases 2 and 4 compared with cases 1 and 3 respectively, markedly decreases the gas phase pressure drop and hence decreases the power cost associated with moving the process vapor through the column. It is also significant that the power savings realized in case 4, vapor thrust apertures with promoter, is greater than the sum of that due to vapor thrust, apertures, case 3, and promoter used separately, case 2.

Referring to FIG. 1, there is shown a conventional fractionating column or tower 130 having a plurality of perforated or sieve-type liquid-gas contacting trays therein and arranged one over the other. One such tray 110 is shown in its entirety. Also shown is a downcomer 132 of a tray above 134, a seal pan 136 and a portion of a sieve tray 138 below are shown. These trays define a plurality of vertically spaced liquid-gas contact stages 140 and 142 through which vapors pass upwardly in the tower 130. Each of the trays 110, 134 and 138 is supported and secured to the walls of tower 130 by tray holder 144. All of the trays within the tower 130 for a particular illustration will have the same general features of construction, and though the discussion hereinafter will be directed more specifically to tray 110, it should be clear that it is equally applicable throughout the tower. Extending below tray 110 is a downcomer element 146 which, in cooperation with the side wall of tower 130 forms a downcomer 148 for the passage of liquid downwardly from the liquid discharge end 150 of contact tray 110 to the liquid approach region 152 of tray 138. Adjacent the lower portions of downcomers 132 and 148 are seal pans 136 having bases 154 and obtusely sloped walls 156. The vertical, tray-side portions of downcomer elements 146, 158 and obtusely sloped walls 156 of seal pans 136 forming liquid approach regions 152. Communicating with obtusely sloped walls 156 are sloped bubble promoters means 160 which extends transversely across trays 110 and 138 and all other trays within column 130. Bubble promoter 160 comprises a flat, sloped surface 161 which may be integral with or attached by some suitable means to the contacting surface 162 of tray 110. Sloped bubble promoter 160 has perforations 118a defined by walls which are substantially normal to the solped surface of promoter 160, however, these walls may be inclined to the surface of promoter 160 such that the angle of inclination would be in the first quadrant. Any attempt to incline the walls of perforations 118a such that the angle of inclination of the walls would lie in the second quadrant would cause a force to be exerted up the promoter surface rather than down the surface. Such a force would tend to cause the liquid to back up in the liquid inlet thus destroying the usefulness of this invention. It would be possible to have perforations orientated in different direction, i.e., some directing vapor up the surface and some directing vapor down the surface, but in such a distribution such that the net force would be down the surface of promoter 160. Still another possibility would be to orient all the perforations such that each had an angle of inclination in the first quadrant. The choice of the angle, however, would present some difficulty in that if too many perforations were inclined too steeply the depth of liquid flowing over the surface of promoter 160 would become too thin resulting in blowing or fluidization of the liquid.

Clear process liquid descending from the tray-above 134 is directed by downcomer baffle element 146 into downcomer 132 and into the base 154 of seal pan 136. The liquid thereupon ascends obtusely sloped wall 156 and enters liquids approach region 152. When the clear liquid reaches the top of obtusely sloped wall 156, thereby exiting from liquid approach region 152, the liquid flows down bubble promoter 160 and onto the contacting surface 162 of the tray proper. As the liquid flows down promoter surface 161 it flows over perforations 118a which have process vapor passing therethrough. The clear liquid entering bubble promoter 160 presents to the rising process vapor an artificial head of liquid lower than that head of liquid which is on the contacting surface 162 of tray 110. As a result of this artificial head, which manifests itself as a reduced pressure region, the clear liquid emerging from liquid approach region 152 is immediately transformed into an active liquid or froth. Vapor flowing through the liquid in this region thereby makes the inlet portion of the tray completely active. As a result of the clear liquid emerging from region 152 being made active, dynamic enhancement carries and sustains this activity over the tray proper thereby rendering the entire tray surface active.

The percent free area in the form of perforations will vary considerably, depending upon the physical properties of the liquids and vapors of any liquid-vapor contacting operation. The percent free area, however, should not be so great as to cause weeping of tray liquid through the perforations at reasonable liquid and vapor loadings. When utilizing a sloped bubble promoter, such as 160 in FIG. 1, it is preferable to "match" the perforated area of the sloped bubble promoter surface to the perforated area of the contacting surface 162, i.e., the percent free area of the bubble promoter surface is approximately equal to the percent free area of the contacting surface. For sloped bubble promoters used in conjunction with perforated trays having vapor thrust openings in addition to perforation, such as FIG. 3, it is preferable to have the free area of the promoter between the percent free area represented by perforations plus the percent free area represented by vapor thrust openings of the contacting surface.

Table B presented below, demonstrates the ability of the sloped bubble promoter of FIG. 1 to render active trays that under similar flow conditions were partially inactive.

The data of Table B is for the system air-water. The experiments were conducted using a perforated or sieve type tray 2 feet long and 1 foot wide and having perforation 0.1875 inch in diameter. The perforated area represented approximately 11% of the total tray area. The gas and liquid flows in each experiment were chosen such that when used with the test tray without sloped bubble promoter, the first eight inches of the test tray were inactive, that is, 37.5% of the total tray surface was inactive under the same liquid and gas flows in the absence of a bubble promoter.

TABLE B.—EXPERIMENTAL EVALUATION OF SLOPED INLET BUBBLE PROMOTER

| $h_{ow}$ | $Q_L/b$, ft.³/sec./ft. | $V_s$, ft./sec. | Remarks |
|---|---|---|---|
| 1⅛ | 0.05 | 1.85 | Fully active. |
| 1⅛ | 0.06 | 2.05 | Do. |
| 1⅛ | 0.08 | 2.36 | Do. |
| 1⅛ | 0.10 | 2.60 | Do. |
| 1⅛ | 0.13 | 2.92 | Do. |
| 1⅛ | 0.16 | 3.10 | Do. |
| 1⅛ | 0.19 | 3.30 | Do. |
| 1⅛ | 0.22 | 3.60 | Do. |
| 0 | 0.05 | 2.15 | Do. |
| 0 | 0.06 | 2.40 | Do. |
| 0 | 0.08 | 2.60 | Do. |
| 0 | 0.10 | 2.70 | Do. |
| 0 | 0.13 | 2.90 | Do. |
| 0 | 0.16 | 3.10 | Fully active, turbulent at inlet. |
| 0 | 0.19 | 3.30 | Do. |
| 0 | 0.22 | 2.60 | Do. |

Where; $h_{ow}$=height of outlet weir, inches.
$Q_L/b$=Cubic feet of tray liquid/sec./foot of tray width.
$V_s$=Superficial vapor velocity, ft./sec.

Bubble promoter dimensions: ½ inch high x 2 in. base; 14½°angle, see FIG. 3.

Referring now to FIG. 2, there is shown a conventional fractionating column or tower 130 having a plurality of perforated or sieve-type liquid-gas contacting trays having vapor thrust openings 113 or slots from which process vapor flowing therethrough contacts a process liquid flowing across at some angle thereby causing the liquid to flow across the tray without the aid of liquid gradients. Thrust openings 113 are arranged in parallel rows on the tray surface and generally face the liquid outlet 150 of the tray, and are formed, as previously discussed, by the cooperation of vapor flow directing surface 123 with contacting surface 162. Tray elements similar to those previously discussed will be given the same numerical designation in the interest of clarity. Liquid-vapor contact trays, represented by tray 110, are arranged in column or tower 130, one over the other such that the trays within column 130 form liquid-vapor contact stages represented by 140 and 142. Each tray is equipped with a downcomer element 146 which cooperates with the walls of tower 130 to form a downcomer represented by 132. Each tray is secured to the tower wall by tray holder 144. All of the trays within column 130 will have the same general features of construction as that shown by tray 110. Extending below tray 134, located above tray 110, is downcomer element 146 which, as previously mentioned, forms downcomer 132 for the passage of liquid downwardly from the tray above 134 to the liquid approach region 152 of tray 110. Adjacent the lower portion of downcomer 132 is seal pan 136 having base 154 and obtusely sloped wall 156. The vertical, tray-side portion 158 of downcomer element 146 forms with base 154 and obtusely sloped wall 156 a liquid approach region 152. Communicating with obtusely sloped wall 156 is sloped bubble promoter means 160 which extends transversely across tray 110. Bubble promoter 160 being comprised of a flat, sloped surface 161 which may be integral with or attached by some suitable means to the contacting surface 162 of tray 110 and has perforations 118a defined by walls which are substantially normal to the sloped surface 161 of promoter 160. Bubble promoter 160 may also be integral with or attached by some suitable means to obtusely sloped wall 156 of seal pan 136. It should be noted that bubble promoter 160 is not equipped with vapor thrust openings 113 as is tray 110.

Process liquid descending from tray-above 134 is directed by downcomer element 146 into downcomer 132 and onto the base 154 of seal pan 136. The liquid thereupon ascends obtusely sloped wall 156 and enters liquid approach region 152. When the liquid reaches the top of obtusely sloped wall 156, thereby exiting from liquid approach region 152, the liquid flows down promoter 160 and onto the contacting surface 162 of tray 110. As the liquid flows down promoter surfaces 161 it flows over perforations 118a which have process vapor passing therethrough. The liquid entering bubble promoter 160 presents to the rising process vapor an artificial head of liquid lower than that which is on contacting surface 162 of tray 110. As a result of this artificial head, the clear liquid emerging from liquid approach region 152 is immediately transformed into an active liquid or froth as a result of the reduced head of liquid and vapor flowing therethrough thereby making this portion of the tray completely active. As a result of the clear liquid from region 152 being made active, the activity is swept across the tray proper thereby rendering the entire tray surface active.

The data of Table C were obtained under operating conditions in a fractionating column of an air separation plant. Test trays 25.5″ in length by 12″ width were employed with and without the sloped bubble promoter of this invention. The test trays were of the vapor thrust construction as shown in FIG. 2. The perforations normal to the tray surface had 0.036 inch diameters. The vapor thrust openings or slots had an average density on the tray surface of 2.3 slots/in.² and each had approximate dimensions; length 0.186″, height 0.025″. The combined free area of the perforations and vapor thrust openings represented approximately 14% of the total area.

TABLE C.—COMPARISON OF OPERATING TRAYS WITH AND WITHOUT BUBBLE PROMOTERS

| $V_s$, ft./sec. | $Q_L$, c.f.s. | No Bubbling Promoter | | Sloped Inlet Promoter | |
|---|---|---|---|---|---|
| | | Foam Depth, Inches | Area Inactive, Percent | Foam Depth, Inches | Area Inactive, Percent |
| 2.95 | 0.135 | 8.0 | 19.5 | 7.0 | 0 |
| 2.90 | 0.088 | 8.0 | 8.0 | 7.0 | 0 |
| 2.53 | 0.088 | 6.5 | 10.0 | 5.7 | 0 |
| 1.93 | 0.092 | 5.0 | 25.0 | 5.0 | 0 |

A comparison of the results apearing in Table C show that the slope bubble promoter completely eliminates tray inactivity at liquid and vapor loads which theretofore made the same tray partially inactive.

FIG. 3 is an isometric view of a portion of the sloped bubble promoter of this invention illustrating the association of promoter 160 with sieve tray 110 having vapor thrust openings 113. FIG. 3 is representative of the bubble promoter used to gather the operating data of Table C. The dimensions of bubble promoter 160, $a$ and $b$ of FIG. 2, may vary considerably depending upon the properties of the liquid and vapor present in a given mass transfer operation. The $b$ dimension of promoter 160 is the controlling dimension. We have found that values of $b$ may vary from just above zero to not greater than about 1.0 inch. We say "just above zero" because it has been discovered that any reduction in the liquid height as it enters upon the contacting surface is beneficial to bubble promotion or dynamic enhancement. As a practical matter, however, values of $b$ from about ¼ to 1.0 inch would be sufficient to achieve the objects of this invention when the slope angle $\phi$ 115 is between about ⅕ to ⅛.₅. Above 1.0 inch the depth of liquid at the highest location on promoter 160, at reasonable liquid loads, becomes too thin and blowing or fluidization of the clear liquid results as the clear liquid descends bubble promoter 160. A further restriction on the $b$ dimension comes about from the fact that excessive downcomer heat losses result if $b > 1.0$ inch. If the slope values are below ⅕ the "$a$" dimension becomes excessive and a substantial portion of the tray becomes sloped creating severe fabricating difficulties; if the slope values exceed ⅛.₅ the inclination of the promoter becomes too steep and causes the liquid depth to run thin on the promoter which causes a result similar to that which occurs when $b=1.0$, viz., blowing or fluidization of the clear liquid occurs.

The use of bubble promoting devices, such as those illustrated herein, are not limited solely to the types of trays which have been illustrated and discussed. A particular shape, form or type of liquid-vapor contacting device is not essential to the successful use of bubble promoters of this invention. The criteria which must be met for successful use of the bubble promoters herein discussed with a liquid-vapor contacting device are that the mass transfer operation to be conducted on the particular device be such that a clear process liquid is to be transformed into a froth by passing a process vapor therethrough. Thus, in addition to those devices illustrated herein, pitched, corrugated, bubble cap, rippled, circular flow and many other contacting trays could successfully employ the novel promoters herein described.

Although preferred embodiments of the invention have been described in detail, it is contemplated that some modifications thereto may be employed without others, all within the spirit and scope of this invention as hereinabove set forth.

What is claimed is:

1. A liquid-gas contacting tray for use in a distillation tower which comprises:
   (a) an imperforate inlet surface forming part of the perimeter of such tray, adapted to be secured normal to the inner wall of said distillation tower for receiving liquid;
   (b) a downcomer member adapted to be positioned substantially parallel to the distillation tower inner wall, spaced above and coextensive with the inlet surface (a) and inwardly from the tray perimeter so as to form an exit path beneath the lower end of said downcomer member for said liquid from such inlet surface;
   (c) a wall contiguously associated and coextensive with the innermost edge of inlet surface (a) and extending upwardly from such edge being inwardly positioned from downcomer member (b) so as to constitute a liquid approach path communicating with said exit path;
   (d) a downwardly and inwardly inclined wall contiguously associated and coextensive with the upper edge of wall (c) having perforations across the entire surface thereof and of sufficiently small cross-sectional area for only upward gas flow therethrough, with the perforation walls being inclined to the top surface of such inclined perforated wall (d) so that the angle of inclination with respect to the downhill side of said top surface is in the first quadrant, thereby permitting the bubbling of rising gas into the downwardly flowing liquid of reduced depth;
   (e) a liquid-gas contact member having a first edge contiguously associated and coextensive with the lower edge of downwardly and inwardly inclined perforated wall (d) constructed to extend transversely across at least part of the distillation tower cross-section, inwardly from inlet surface (a), downcomer member (b), wall (c), and downwardly inclined perforated wall (d), having a multiplicity of openings therethrough for gas flow from the bottom side to the top side and bubbling through the already bubbling liquid-gas mixture flowing across the top side thereof from the downwardly and inwardly inclined perforated wall (d); and
   (f) a liquid discharge opening at the perimeter of said tray opposite from said imperforate inlet surface (a) being contiguously associated with a second edge of said liquid-gas contact member (e) opposite to the first edge of such member.

2. A liquid-gas contacting tray according to claim 1 in which said liquid-gas contact member (e) is flat and has a plurality of fixed openings extending therethrough.

3. A liquid-gas contacting tray according to claim 1 in which said liquid-gas contact member (e) has a main flat surface with a plurality of fixed first openings extending therethrough and defined by walls substantially normal to said main flat surface; and a plurality of fixed second slot openings each of larger cross-sectional area than each of said first openings and extending through said surface, each slot opening formed by a section raised from said main flat surface being joined thereto by an inclined back wall and having a front leading edge separated from and above such surface and oriented to face said liquid discharge opening (f).

4. A liquid-gas contacting tray according to claim 1 in which said liquid-gas contact member (e) has a main flat surface with a plurality of fixed first openings extending therethrough and defined by walls substantially normal to said main flat surface; and a plurality of fixed second slot openings each of larger cross-sectional area than each of said first openings, each slot opening formed by a section raised from said main flat surface being joined thereto by two inclined side walls and an inclined back wall with the upper edge of each wall joined to a raised cover, the front leading edges of said side walls and said cover being separated from and above said main flat surface and oriented to face said liquid discharge opening (f).

5. A liquid-gas contacting tray according to claim 1 in which said angle of inclination of said perforation walls with respect to the downhill side of said top surface of downwardly and inwardly inclined wall (d) is 90 degrees.

6. A liquid-gas contacting tray according to claim 1 in which wall (c) is inclined with respect to imperforate inlet surface (a).

References Cited by the Examiner

UNITED STATES PATENTS

| | | |
|---|---|---|
| 2,693,949 | 11/1954 | Huggins. |
| 2,702,696 | 2/1955 | Pappas. |
| 2,752,139 | 6/1956 | Huggins _____ 261—114 |

(Other references on following page)

| UNITED STATES PATENTS | | |
|---|---|---|
| 2,772,080 | 11/1956 | Huggins et al. |
| 2,832,578 | 4/1958 | Gilmore. |
| 2,884,236 | 4/1959 | Maille. |
| 2,903,251 | 9/1959 | Thrift. |

FOREIGN PATENTS 316,719  12/1956  Switzerland.

HARRY B. THORNTON, *Primary Examiner.*

RONALD R. WEAVER, *Examiner.*

UNITED STATES PATENT OFFICE
CERTIFICATE OF CORRECTION

Patent No. 3,282,576　　　　　　　　　　　　　　　November 1, 1966

Walter Bruckert et al.

It is hereby certified that error appears in the above numbered patent requiring correction and that the said Letters Patent should read as corrected below.

Column 2, line 8, for "thee" read -- the --; line 11, for "are" read -- area --; column 3, line 23, for "eralized" read -- realized --; column 4, line 57, for "liquids" read -- liquid --; column 7, line 1, for "apeparing" read -- appearing --; line 29, for "heat" read -- head --.

Signed and sealed this 5th day of September 1967.

(SEAL)
Attest:

ERNEST W. SWIDER　　　　　　　　　　　　　　　EDWARD J. BRENNER
Attesting Officer　　　　　　　　　　　　　　　Commissioner of Patents